United States Patent
Miyachi et al.

(10) Patent No.: US 10,550,939 B2
(45) Date of Patent: Feb. 4, 2020

(54) SADDLE-RIDE TYPE VEHICLE

(71) Applicant: Kabushiki Kaisha F.C.C., Hamamatsu-shi, Shizuoka (JP)

(72) Inventors: Kazuyoshi Miyachi, Hamamatsu (JP); Shouji Makita, Hamamatsu (JP); Ryouhei Chiba, Hamamatsu (JP); Kaoru Iida, Hamamatsu (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 16/331,203

(22) PCT Filed: Jun. 28, 2017

(86) PCT No.: PCT/JP2017/023705
§ 371 (c)(1),
(2) Date: Mar. 7, 2019

(87) PCT Pub. No.: WO2018/051608
PCT Pub. Date: Mar. 22, 2018

(65) Prior Publication Data
US 2019/0277400 A1    Sep. 12, 2019

(30) Foreign Application Priority Data

Sep. 15, 2016    (JP) ................................. 2016-180622

(51) Int. Cl.
*F16H 63/18*      (2006.01)
*B62M 25/02*      (2006.01)
(Continued)

(52) U.S. Cl.
CPC .............. *F16H 63/18* (2013.01); *B62M 7/02* (2013.01); *B62M 11/06* (2013.01); *B62M 25/02* (2013.01);
(Continued)

(58) Field of Classification Search
CPC .. F16H 63/18; F16H 57/02; F16H 2057/0203; F16H 2057/02065; F62M 11/06; F62M 7/02; F62M 25/02
(Continued)

(56) References Cited

U.S. PATENT DOCUMENTS

2004/0093974 A1    5/2004    Nesseth
2010/0212448 A1    8/2010    Sato
(Continued)

FOREIGN PATENT DOCUMENTS

JP    2009133439 A    6/2009
JP    2010111389 A    5/2010
(Continued)

OTHER PUBLICATIONS

International Search Report dated Sep. 26, 2017 filed in PCT/JP2017/023705.
(Continued)

*Primary Examiner* — Tony H Winner
*Assistant Examiner* — Felicia L. Brittman
(74) *Attorney, Agent, or Firm* — Rankin, Hill & Clark LLP (57) ABSTRACT

Provided is a saddle-ride type vehicle, which does not reduce cooling efficiency of an engine, is hardly affected by heat from the engine, and can increase a degree of freedom of configuration such as the orientation at the time of arrangement, size and shape of a shift actuator. The saddle-ride type vehicle (100) includes the engine (120), and the engine (120) has a cylinder block (120a), a cylinder head (120b) and a head cover (120c) and has a crankcase (123) below the cylinder block (120a). The saddle-ride type vehicle (100) also includes a shift drum drive unit (140) for rotating a shift drum (136) which changes a gear train (133) in a transmission (132). The shift drum drive unit (140)
(Continued)

includes a shift actuator (141) formed of an electric motor, and a decelerator (142). The shift drum drive unit (140) is attached to a front surface of the crankcase (123) below the cylinder block (120*a*) via a unit case (146) housing the decelerator (142).

4 Claims, 5 Drawing Sheets

(51) Int. Cl.
*B62M 7/02* (2006.01)
*F16H 57/02* (2012.01)
*B62M 11/06* (2006.01)

(52) U.S. Cl.
CPC ..... *F16H 57/02* (2013.01); *F16H 2057/0203* (2013.01); *F16H 2057/02065* (2013.01)

(58) Field of Classification Search
USPC .......................................................... 180/230
See application file for complete search history.

(56) References Cited

U.S. PATENT DOCUMENTS

| | | |
|---|---|---|
| 2011/0239805 A1 | 10/2011 | Fujimoto |
| 2015/0274011 A1 | 10/2015 | Fujimoto |
| 2017/0276038 A1* | 9/2017 | Mukohara .............. B01D 29/03 |

FOREIGN PATENT DOCUMENTS

| | | |
|---|---|---|
| JP | 2010196855 A | 9/2010 |
| JP | 2011208766 A | 10/2011 |
| JP | 2015194191 A | 11/2015 |

OTHER PUBLICATIONS

Japanese Office Action/Notification of Reasons for Refusal dated Aug. 7, 2018 for the corresponding Japanese Patent Application No. 2016-180622.

Decision to Grant a Patent dated Nov. 6, 2018 for the corresponding Japanese Patent Application No. 2016-180622.

* cited by examiner

SADDLE-RIDE TYPE VEHICLE

TECHNICAL FIELD

The present invention relates to a saddle-ride type vehicle which is a motorcycle including a shift actuator for changing a gear train of a transmission.

BACKGROUND ART

Conventionally, the saddle-ride type vehicle typified by the motorcycle for a rider to sit and drive while straddling a seat is provided with a power transmission device. The power transmission device transmits a driving force generated by an engine (a prime mover) to driving wheels. The power transmission device is a mechanical device which changes and transmits a rotational speed of a crankshaft of the engine to the driving wheels while being connected to and disconnected from the crankshaft. The power transmission device is mainly composed of a clutch and the transmission.

Here, the clutch is a mechanical device which transmits a rotational driving force of the crankshaft to the transmission side while being connected to and disconnected from the crankshaft of the engine. The transmission is a mechanical device which changes the rotational speed of the crankshaft of the engine by a plurality of shift stages formed by a combination of a plurality of gears, and transmits the speed to the driving wheel side.

In this case, the transmission is configured to change the plurality of shift stages by the rotational driving force of the shift actuator including an electric motor. For example, the saddle-ride type vehicle disclosed in the following Patent Literatures 1 and 2 is configured such that the shift actuator is provided in the vicinity of a cylinder block of the engine.

CITATION LIST

Patent Literature

Patent Literature 1: JP-A-2011-208766
Patent Literature 2: U.S. Patent Application Publication No. 2004/0093974

However, in the saddle-ride type vehicle described in the above Patent Literature 1, the shift actuator is disposed behind the cylinder of the engine and between the crankshaft and a pivot shaft. Therefore, since there is little margin in an arrangement space, there are problems that the orientation, size and shape of the shift actuator which can be arranged are limited, and the shift actuator is easily affected by heat from the cylinder.

Further, in the saddle-ride type vehicle described in the above Patent Literature 1, the shift actuator is disposed in front of the cylinder of the engine. Therefore, there is a problem that the shift actuator is easily affected by heat from the cylinder while the vehicle is stopped. Furthermore, since the shift actuator blocks a flow of air from the front to the cylinder while the vehicle is traveling, there is a problem that cooling efficiency is reduced.

The present invention has been made to address the above problems. An object of the present invention is to provide the saddle-ride type vehicle as follows. The saddle-ride type vehicle does not reduce the cooling efficiency of the engine and is hardly affected by heat from the engine. Furthermore, in the saddle-ride type vehicle, a degree of freedom of configuration of the shift actuator, such as the orientation at the time of arrangement, size and shape, is large.

SUMMARY OF THE INVENTION

In order to achieve the above-described object, an aspect of the present invention is a saddle-ride type vehicle which includes: an engine provided between a front wheel and a rear wheel and generating a driving force by combustion of fuel; a cylinder block constituting a part of the engine; a crankcase provided below the cylinder block; a transmission for changing a rotational speed by a plurality of gear trains constituting a plurality of shift stages having different gear ratios with respect to the driving force of the engine; and a shift actuator for rotating a shift drum which changes the gear train in the transmission. The shift actuator is disposed below the cylinder block and in front of the crankcase.

In this case, the shift actuator includes a case where the shift actuator itself is directly supported by a support member such as the crankcase or a frame, and a case where the shift actuator is supported by the support member such as the crankcase or the frame, via the decelerator for reducing the rotational driving force or via a unit case enclosing the decelerator and supporting the shift actuator.

According to an aspect of the present invention configured as described above, in the saddle-ride type vehicle, the shift actuator is disposed below the cylinder block and in front of the crankcase. Therefore, it is possible to prevent the shift actuator from reducing the cooling efficiency of the engine. Further, the shift actuator is hardly affected by heat from the engine. Furthermore, it is possible to increase the degree of freedom of configuration such as the orientation at the time of arrangement, size and shape of the shift actuator.

Further, another aspect of the present invention is the saddle-ride type vehicle further includes a decelerator provided together with the shift actuator at a position below the cylinder block and in front of the crankcase, to reduce and transmit a rotational driving force of the shift actuator to the shift drum. The shift actuator is disposed on an inner side in a vehicle width direction from the decelerator.

According to another aspect of the present invention configured as described above, in the saddle-ride type vehicle, the shift actuator is disposed on the inner side in the vehicle width direction of the saddle-ride type vehicle from the decelerator. Therefore, it is possible to prevent the shift actuator from being damaged when the saddle-ride type vehicle falls over.

Further, according to another aspect of the present invention, in the saddle-ride type vehicle, the shift actuator is provided in such a direction that an axial direction of rotational drive extends in the vehicle width direction.

According to another aspect of the present invention configured as described above, in the saddle-ride type vehicle, the shift actuator is provided in such a direction that the axial direction of the rotational drive extends in the vehicle width direction. Therefore, it is possible to position a center of gravity position of the shift actuator on a center side of a vehicle body. Thus, it is possible to improve maneuverability of the saddle-ride type vehicle and stability of the vehicle by suppressing displacement of the center of gravity in the vehicle width direction.

Further, according to another aspect of the present invention, in the saddle-ride type vehicle, the shift actuator is disposed on the inner side in the vehicle width direction from a side surface of the crankcase.

According to another aspect of the present invention configured as described above, in the saddle-ride type vehicle, the shift actuator is disposed on the inner side in the vehicle width direction from the side surface of the crankcase. Therefore, it is possible to prevent the shift actuator from being damaged when the saddle-ride type vehicle falls over.

Further, according to another aspect of the present invention, the saddle-ride type vehicle further includes a rod-shaped transmission body for transmitting a rotational driving force of the shift actuator to the shift drum. The crankcase has a crankcase cover protruding in a circular shape in a side view outwardly in a vehicle width direction, and the transmission body is disposed above or below the crankcase cover.

According to another aspect of the present invention configured as described above, in the saddle-ride type vehicle, the rod-shaped transmission body for transmitting the rotational driving force of the shift actuator to a shift drum is disposed above or below the crankcase cover. Therefore, it is possible to suppress the transmission body from protruding outwardly in the vehicle width direction, so that the saddle-ride type vehicle can be made compact. Further, in the saddle-ride type vehicle according to the present invention, when the transmission body is disposed above the crankcase cover, it is possible to prevent the transmission body from being contaminated and damaged due to obstacles such as curbs on the ground or flying objects from the ground. Furthermore, in the saddle-ride type vehicle according to the present invention, when the transmission body is disposed below the crankcase cover, thermal influence from the cylinder block can be prevented.

DESCRIPTION OF THE EMBODIMENTS

Figure 1:
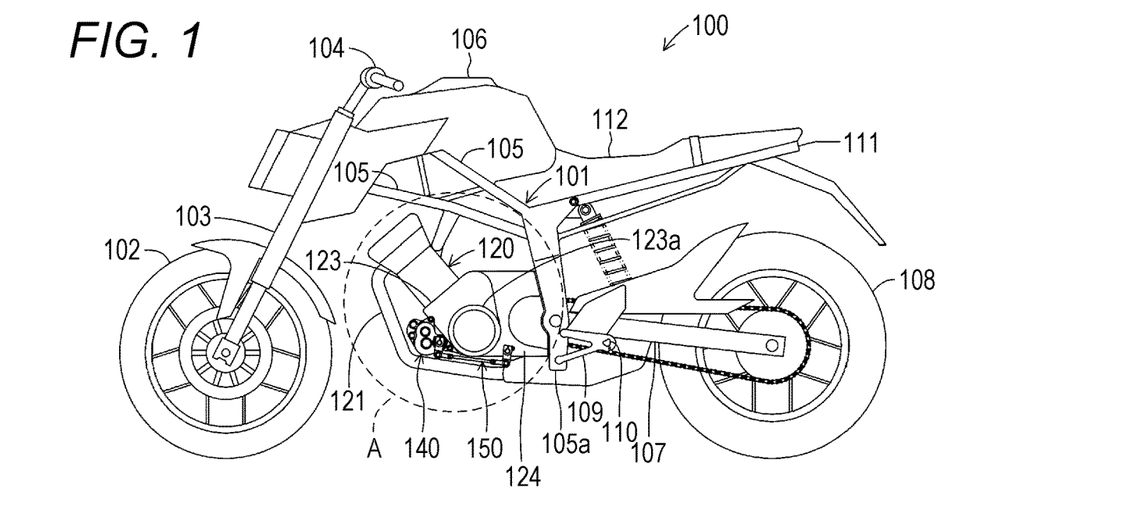
FIG. 1 is a side view showing an outline of an overall structure of a saddle-ride type vehicle according to the present invention.
Figure 2:
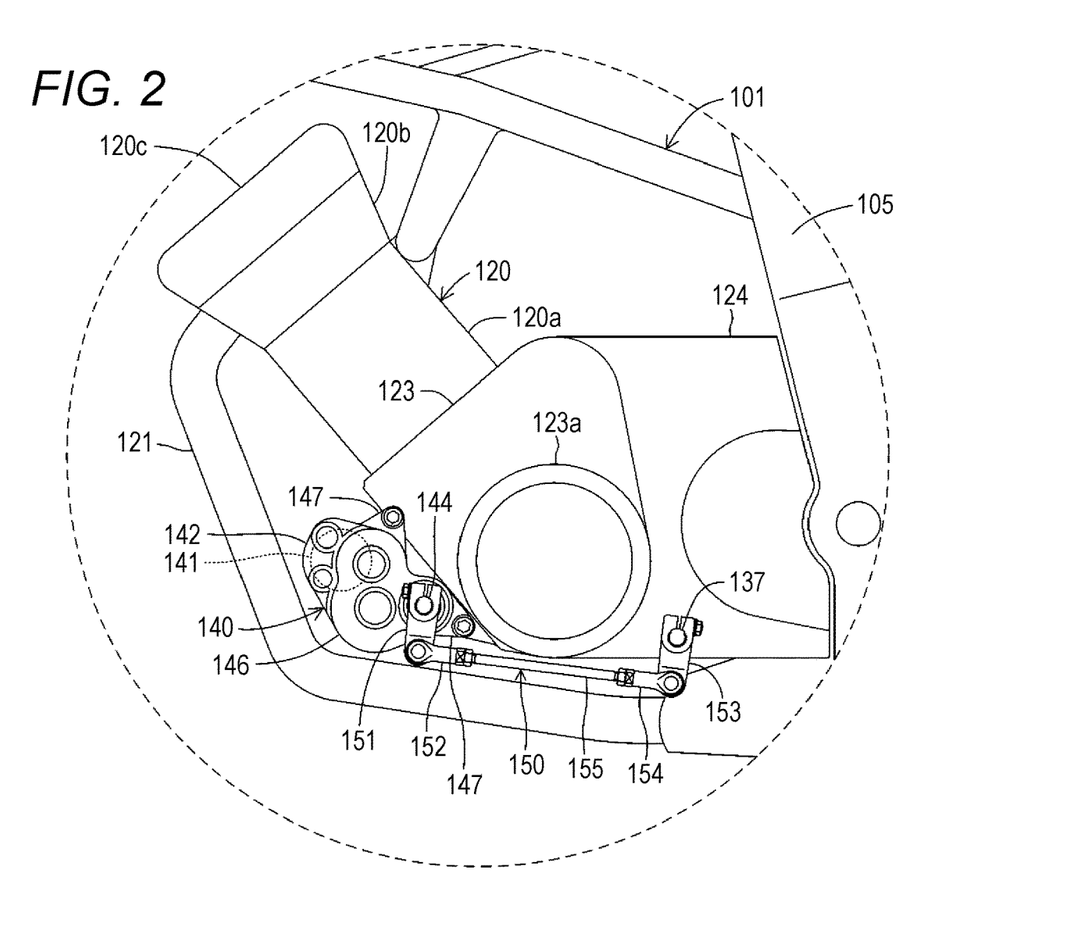
FIG. 2 is a partially enlarged view of a portion within a dashed circle A shown in FIG. 1.

An embodiment of a saddle-ride type vehicle according to the present invention will be described with reference to the drawings below. FIG. 1 is a side view schematically showing an outline of an overall structure of a saddle-ride type vehicle 100 according to the present invention. FIG. 2 is a partially enlarged view showing a structure within a dashed circle A shown in FIG. 1. It should be noted that each of the drawings referred to in this specification is schematically illustrated such that some constituent elements are exaggeratedly illustrated for easy understanding of the present invention. Therefore, the dimensions, ratios and the like between the constituent elements may be different. The saddle-ride type vehicle 100 is a so-called saddle-ride type two-wheeled automobile (so-called motorcycle) for a rider to ride while straddling.

(Structure of Saddle-Ride Type Vehicle 100)

The saddle-ride type vehicle 100 includes a frame 101. The frame 101 is a component constituting a skeleton of the saddle-ride type vehicle 100. The frame 101 is formed by combining a plurality of pipes or plate materials made of iron or aluminum. The frame 101 mainly includes a head pipe (not shown), a main frame 105, and a seat rail 111. The head pipe is a tubular portion which supports a front wheel 102 of the saddle-ride type vehicle 100 via a front fork 103. The front fork 103 is formed rotatable in a lateral direction of the saddle-ride type vehicle 100 with respect to the head pipe. Further, a handle 104 for steering a traveling direction of the saddle-ride type vehicle 100 is provided at an upper end portion of the front fork 103.

The main frame 105 is a central portion of the frame 101, which passes above an engine 120 and determines a strength of the frame 101. The main frame 105 is formed to have a shape extending from the front to the rear of the saddle-ride type vehicle 100 and then bent downward at the center of the vehicle. The main frame 105 supports a fuel tank 106 above a front portion thereof. Further, the main frame 105 supports a swing arm 107 and a step bracket 109 by a rear end portion 105a of the main frame 105. Furthermore, the main frame 105 supports the engine 120 and a power transmission device 124 in a suspended state.

The swing arm 107 supports a rear wheel 108 of the saddle-ride type vehicle 100 so as to be vertically movable with the rear end portion 105a as a base point. The step bracket 109 supports a stick-shaped foot placing step 110 on which the rider riding the saddle-ride type vehicle 100 puts each of the rider's feet.

The seat rail 111 mainly supports a sitting seat 112, a loading platform (reference numeral omitted), and a tail lamp (reference numeral omitted). The seat rail 111 is formed to extend to the rear of the main frame 105. The sitting seat 112 is a component for the rider of the saddle-ride type vehicle 100 to sit while straddling, and is constituted by a cushion member.

The engine 120 is a prime mover which generates a rotational driving force by combustion of fuel supplied from the fuel tank 106. Specifically, the engine 120 mainly includes a cylinder block 120a, a cylinder head 120b, and a head cover 120c. The cylinder block 120a is a block-shaped component having a cylindrical cylinder (not shown) in which a piston (not shown) slides. The cylinder block 120a is formed by die cast molding of aluminum alloy.

The cylinder head 120b is provided to cover an upper surface of the cylinder block 120a. The cylinder head 120b is a component having a passage for introducing an air-fuel mixture of fuel and air into the cylinder and discharging combustion gas from inside the cylinder. The cylinder head 120b is formed by die cast molding of aluminum alloy. An exhaust pipe for guiding the combustion gas to a muffler extends from the cylinder head 120b. The head cover 120c is a component for covering the cylinder head 120b and formed by die cast molding of aluminum alloy.

That is, the engine 120 is a so-called reciprocating engine. The engine 120 introduces the air-fuel mixture into the cylinder formed in the cylinder block 120a, and ignites and explodes the air-fuel mixture by a spark plug (not shown), to reciprocate the piston in the cylinder. Thus, the engine 120 generates the rotational driving force to a crankshaft (not shown) connected to the piston. The rotational driving force of the crankshaft is transmitted to a clutch 125 in the power transmission device 124 via a primary drive gear 122 attached to an end portion of the crankshaft.

In the present embodiment, the engine 120 is assumed to be a so-called four-stroke engine. However, it will be understood that the engine 120 may be a so-called two-stroke engine. Further, in the present embodiment, the engine 120 is assumed to be a two-cylinder engine provided with two cylinders. However, it will be understood that the engine 120 may be an engine of one cylinder or three or more cylinders.

The crankshaft is housed in a crankcase 123. The crankcase 123 is an outer casing constituting a part of the engine 120. In addition to the crankshaft, the crankcase 123 holds and houses some components such as a transmission 132 and a shift drum 136, which constitute the power transmission device 124. The crankcase 123 is formed as a separate body from the cylinder block 120a by die cast molding of aluminum alloy. The crankcase 123 is integrally connected below the cylinder block 120a.

Figure 3:
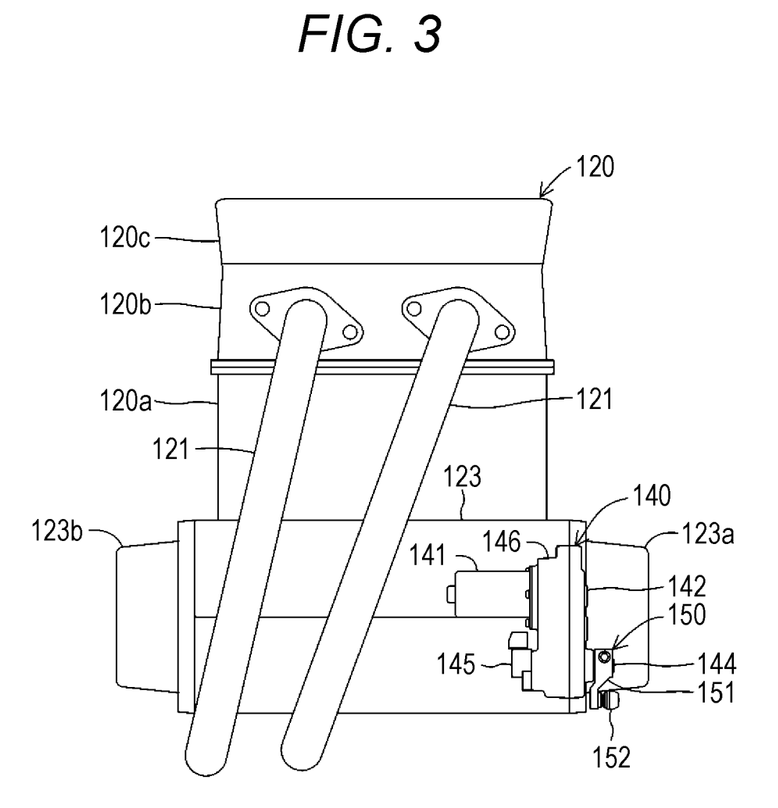
FIG. 3 is a partially enlarged view of an engine and a crankcase as viewed from the front of the saddle-ride type vehicle in order to explain a mounted state of a shift drum drive unit shown in FIG. 1.

In this case, as shown in FIG. 3, the crankcase 123 is provided with crankcase covers 123a and 123b partially protruding to the outside respectively from side surface portions at both ends in a vehicle width direction of the saddle-ride type vehicle 100. The crankcase covers 123a and 123b are detachably provided to the crankcase 123. The crankcase covers 123a and 123b are metal components which close a space for housing a generator (not shown) or the clutch 125 in the crankcase 123. The crankcase covers 123a and 123b are formed to have substantially circular portions in a side view which protrude outward in the vehicle width direction (hereinafter may be simply referred to as "vehicle width direction") of the saddle-ride type vehicle 100. A shift drum drive unit 140, which will be described below, is provided on a front surface portion of the crankcase 123.

Figure 4:
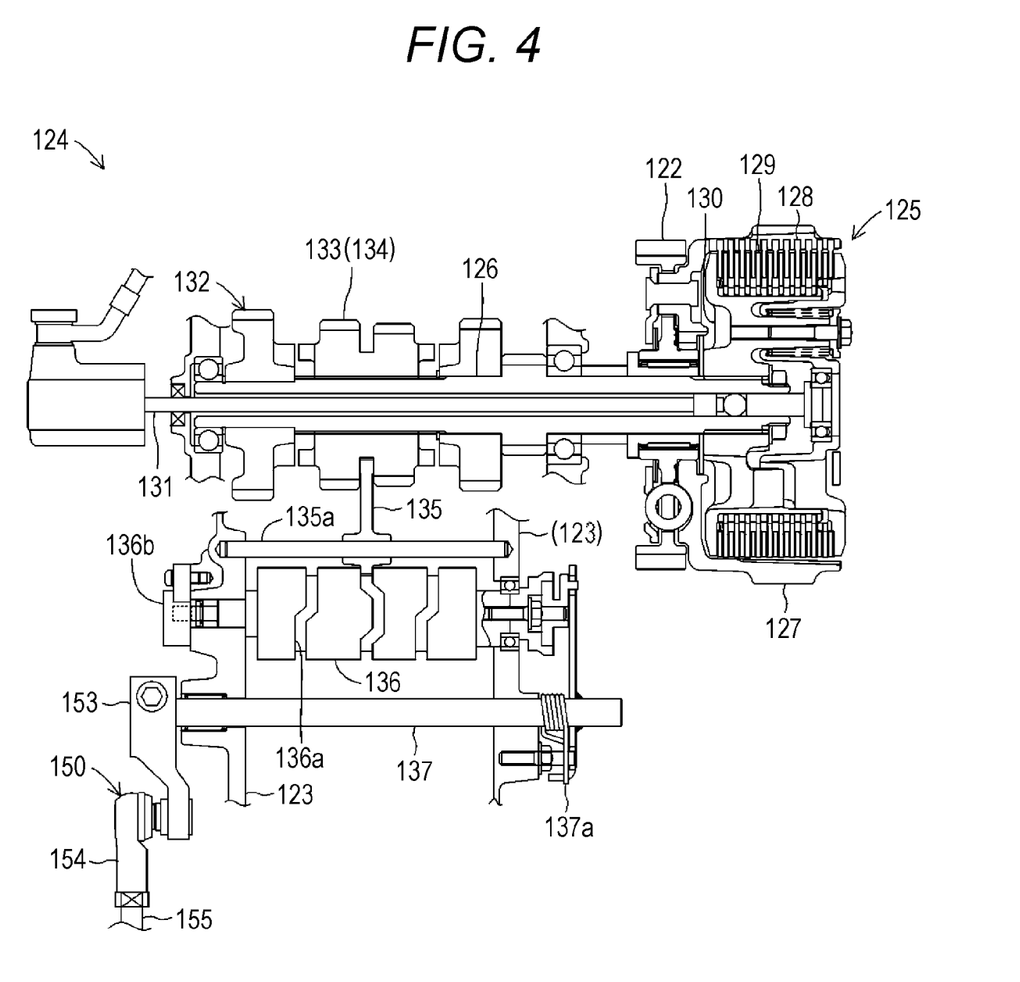
FIG. 4 is a partially broken cross-sectional view schematically showing an outline of an overall structure of a power transmission device in the saddle-ride type vehicle shown in FIG. 1.

As shown in FIG. 4, the power transmission device 124 is a mechanical device which shifts and transmits the rotational driving force generated by the engine 120 by a plurality of shift stages. The power transmission device 124 mainly includes the clutch 125 and the transmission 132.

The clutch 125 is disposed between the engine 120 and the transmission 132 on a transmission path of the rotational driving force generated by the engine 120. The clutch 125 is a mechanical device which transmits and interrupts the rotational driving force generated by the engine 120 to the transmission 132. Specifically, as shown in FIG. 4, the clutch 125 is provided on an end portion side (a right side in the drawing) of a main shaft 126 axially extending from the transmission 132. Note that hatching is omitted in FIG. 3.

The clutch 125 includes a plurality of friction plates 128 and clutch plates 129 which are pressed against or spaced apart from each other in a clutch housing 127 which is formed by molding an aluminum alloy material into a bottomed cylindrical shape. In this case, the friction plate 128 is held by the clutch housing 127. The clutch housing 127 is rotationally driven together with rotational driving of the engine 120. The clutch plate 129 is held by a clutch hub 130 connected to the main shaft 126.

In the clutch 125, a push rod 131 passing through the main shaft 126 is pressed to the right side in the drawing by a clutch actuator (not shown), so that the friction plate 128 and the clutch plate 129 are separated from each other to enter a disengaged state in which the driving force of the engine 120 is not transmitted to the transmission 132. Further, in the clutch 125, the push rod 131 is drawn to the left side in the drawing by the clutch actuator, so that the friction plate 128 and the clutch plate 129 are pushed together to enter an engaged state in which the driving force of the engine 120 is transmitted to the transmission 132. It should be noted that the clutch actuator is constituted by an electric motor. Operation of the clutch actuator is controlled by a TCU (Transmission Control Unit) (not shown).

Here, the TCU includes a microcomputer composed of a CPU, a ROM, a RAM and the like. The TCU comprehensively controls operation of the power transmission device 124 according to a control program (not shown) stored in advance in a ROM or the like. More specifically, the TCU executes control of engagement and disengagement of the clutch 125 and control of shift operations such as upshift and downshift in the transmission 132. In this case, the TCU controls the operation of the clutch actuator by PWM control.

The transmission 132 is a mechanical device for shifting the rotational driving force generated from the engine 120 by a plurality of shift stages (for example, five shift stages) and transmitting the force to the rear wheel 108. The transmission 132 is configured to be provided with a plurality of gear trains 133. The plurality of gear trains 133 constitutes a plurality of shift stages having different gear ratios between the main shaft 126 and a counter shaft (not shown). The main shaft 126 is connected to the crankshaft of the engine 120 via the clutch 125. The counter shaft extends parallel to the main shaft 126 and is connected to the rear wheel 108.

The gear train 133 includes a plurality of drive side gears 134 provided on the main shaft 126, and a plurality of driven side gears (not shown) provided on the counter shaft. In the drive side gears 134 and the driven side gears, the gears facing each other are paired and constantly meshed with each other. In this case, a shift fork 135 is inserted in some of the drive side gears 134 and the driven side gears. The drive side gears 134 and the driven side gears are slidably displaced respectively on the main shaft 126 and on the counter shaft by the shift fork 135, and are connected to and separated from each other by a dog clutch method, so that a shift stage is formed.

The shift fork 135 is a fork-like component for forming a shift stage by axially pressing and sliding the drive side gear 134 and the driven side gear which are slidable. One end portion of the shift fork 135 is fitted into the drive side gear 134 and the driven side gear. The other end portion of the shift fork 135 is supported by a shift fork shaft 135a in a state of being fitted into the shift drum 136. The shift drum 136 is a columnar component for reciprocally displacing the shift fork 135 along the main shaft 126 and the counter shaft. More specifically, as shown in FIG. 4, in the shift drum 136, a cam groove 136a into which the other end portion of the shift fork 135 is fitted is formed on an outer peripheral surface of a column body. By rotational drive of the shift drum 136, the shift fork 135 is slidably displaced in an axial direction along the cam groove 136a.

The shift drum 136 is supported by the crankcase 123 so as to be rotatable in a state where a shift shaft 137 is connected to the shift drum 136. Further, an angle sensor 136b is provided at one end portion of the shift drum 136. The angle sensor 136b is a detector for detecting a rotation angle of the shift drum 136. The angle sensor 136b is connected to the TCU.

The shift shaft 137 is a component for rotationally driving the shift drum 136 so as to be in a predetermined rotation angle position by being rotationally driven by the shift drum drive unit 140 described later. The shift shaft 137 is formed by forming a steel material into a rod shape. The shift shaft 137 is supported by the crankcase 123 so as to be rotatable in a direction parallel to the shift drum 136. In this case, one end portion (right side in the drawing) of the shift shaft 137 is connected to the shift drum 136 via a return spring 137a. Further, the other end (left side in the drawing) of the shift shaft 137 passes through the crankcase 123 and protrudes to the outside of the crankcase 123.

The return spring 137a is a coil spring for returning the shift shaft 137 to a neutral position. The shift drum drive unit 140 is connected to a tip end portion side of the shift shaft 137 protruding to the outside of the crankcase 123 via a shift drive force transmission body 150.

Figure 5:
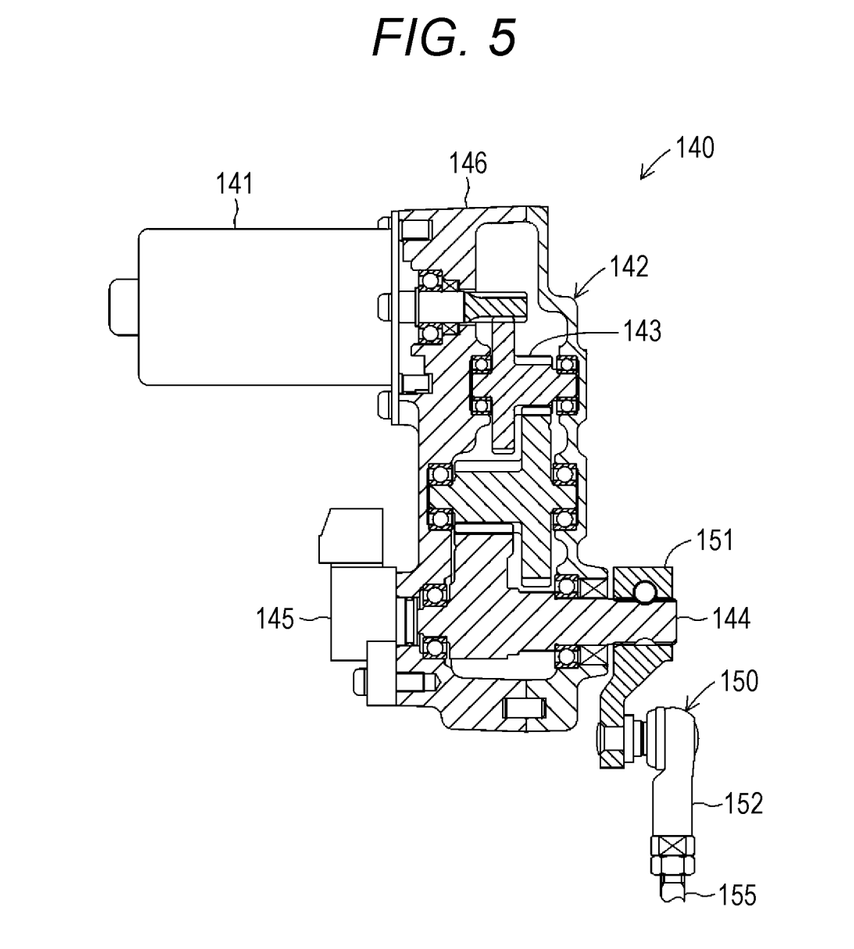
FIG. 5 is a cross-sectional view showing an outline of an internal structure of the shift drum drive unit shown in FIG. 3.

The shift drum drive unit 140 is a mechanical device for rotationally driving the shift drum 136 to position the shift drum 136 so as to be in the predetermined rotation angle position. As shown in FIG. 5, the shift drum drive unit 140 mainly includes a shift actuator 141 and a decelerator 142.

The shift actuator 141 is a prime mover for reassembling the shift stage including the gear train 133 according to the rotation angle by rotationally driving the shift drum 136 via the shift shaft 137. The shift actuator 141 includes an electric motor of which operation is controlled by the TCU. In this case, the shift actuator 141 may be a brushless motor. However, in the present embodiment, the shift actuator 141 includes a DC motor with a brush. The shift actuator 141 is attached to a unit case 146 for housing the decelerator 142. Note that the TCU controls operation of the shift actuator 141 by PWM control. Further, in FIG. 2, a position of the shift actuator 141 is indicated by a dashed line.

The decelerator 142 is a mechanical device for decelerating and outputting a rotational driving force of the shift actuator 141. The decelerator 142 is configured such that a gear train 143 for reducing the rotational driving force of the shift actuator 141 and an output shaft 144 rotationally driven by the gear train 143 are housed in the unit case 146. In this case, the output shaft 144 is housed in the unit case 146 so that both ends thereof are exposed from the unit case 146. A drive side arm 151 is connected to one end portion of the output shaft 144. Further, an angle sensor 145 is attached to the other end of the output shaft 144. The angle sensor 145 is a detector for detecting a rotation angle position of the output shaft 144 and is connected to the TCU. Note that the angle sensor 145 can be attached to the shift shaft 137 instead of the output shaft 144.

The unit case 146 is an outer casing which houses the gear train and the output shaft 144 and supports the shift actuator 141 and the angle sensor 145. The unit case 146 is formed by die cast molding of aluminum alloy. Therefore, the unit case 146 supports the shift actuator 141 on the input side of the gear train 143 and supports the angle sensor 145 on the output shaft 144 side. That is, the shift actuator 141 is supported by the opposite side to the output shaft 144 in the unit case 146.

A mounting portion 147 is formed in a state of protruding on an outer surface of the unit case 146. The unit case 146 is attached to a front portion of the saddle-ride type vehicle 100 in the crankcase 123 via the mounting portion 147. That is, the shift drum drive unit 140 is attached to the front surface of the crankcase 123.

In this case, the shift drum drive unit 140 is mounted at a position inside both side surfaces of the crankcase 123 in the vehicle width direction, more specifically inside the crankcase covers 123a, 123b in the vehicle width direction. Further, in the shift drum drive unit 140, the shift actuator 141 is disposed at a position inside in the vehicle width direction from the decelerator 142 and mounted in such a direction that a rotation axis direction of the shift actuator 141 extends in the vehicle width direction.

As shown in FIG. 2, the shift drive force transmission body 150 is a component for transmitting the rotational driving force generated by the shift drum drive unit 140 to rotationally drive the shift shaft 137. The shift drive force transmission body 150 mainly includes the drive side arm 151, a drive side connector 152, a driven side arm 153, a driven side connector 154, and a transmission body 155.

The drive side arm 151 is a metal component connected to the output shaft 144 of the shift drum drive unit 140 and extending radially outwardly from the output shaft 144. The drive side connector 152 is a metal component connected to a tip end portion of the drive side arm 151 in a freely rotatable state and extending radially outwardly from a center of this rotation. The driven side arm 153 is a metal component connected to the shift shaft 137 and extending radially outwardly from the shift shaft 137. The driven side connector 154 is a metal component connected to a tip end portion of the driven side arm 153 in a freely rotatable state and extending radially outwardly from a center of this rotation.

The transmission body 155 is a metal rod body for connecting the drive side connector 152 and the driven side connector 154 to each other. Both end portions of the transmission body 155 are respectively screw engaged with the drive side connector 152 and the driven side connector 154. That is, the shift drive force transmission body 150 includes a link mechanism. The shift drive force transmission body 150 is provided so that the transmission body 155 is positioned above the crankcase cover 123a and at a position inside in the vehicle width direction from the crankcase cover 123a.

(Operation of Saddle-Ride Type Vehicle 100)

Next, the operation of the saddle-ride type vehicle 100 configured as described above will be described. The saddle-ride type vehicle 100 runs while performing a shift stage change in the transmission 132, that is, the upshift or the downshift according to the shift operations by the rider's switch operation or a determination of the TCU.

In a shift stage change process in the transmission 132, the TCU rotates the shift actuator 141 forward or reverse by a predetermined amount according to a target shift stage with respect to a current shift stage. Thus, the shift drum drive unit 140 rotationally drives the shift shaft 137 via the shift drive force transmission body 150. As a result, in the transmission 132, the shift drum 136 is rotationally driven by rotational drive of the shift shaft 137, the gear train 133 is reassembled so that the shift stage is changed. In this case, the TCU controls a rotation drive amount of the shift actuator 141 while detecting rotation angles of the shift drum 136 and the shift shaft 137 using detection signals from the angle sensors 136b and 145.

In such a running state of the saddle-ride type vehicle 100, since the shift drum drive unit 140 is disposed below the cylinder block 120a, it is possible to ensure ventilation to the cylinder block 120a, the cylinder head 120b and the head cover 120c, thereby preventing reduction in cooling efficiency. In this case, the shift drum drive unit 140 is disposed below the cylinder block 120a, and is not disposed downwind of the cylinder block 120a, the cylinder head 120b and the head cover 120c. Therefore, the shift drum drive unit 140 can be prevented from thermal influence from them.

Further, the shift drum drive unit 140 is disposed in front of the crankcase 123, where there is enough space. Therefore, it is possible to increase the degree of freedom of configuration of the shift drum drive unit 140 including the shift actuator 141, such as the orientation of arrangement, size and shape.

As can be understood from the above operation explanation, according to the above embodiment, in the saddle-ride type vehicle 100, the shift actuator 141 is disposed below the cylinder block 120a and in front of the crankcase 123. Therefore, it is possible to prevent the shift actuator 141 from reducing the cooling efficiency of the engine 120. Further, the shift actuator 141 is hardly affected by heat from the engine 120. Furthermore, it is possible to increase the degree of freedom of configuration such as the orientation at the time of arrangement, size and shape of the shift actuator 141.

Furthermore, implementation of the present invention is not limited to the above embodiment, and various modifications can be made without departing from the object of the present invention. In the drawings referred to in description of the following modifications, the same reference numerals are given to the same constituent parts as those of the above embodiment, and description thereof will be omitted.

Figure 6:
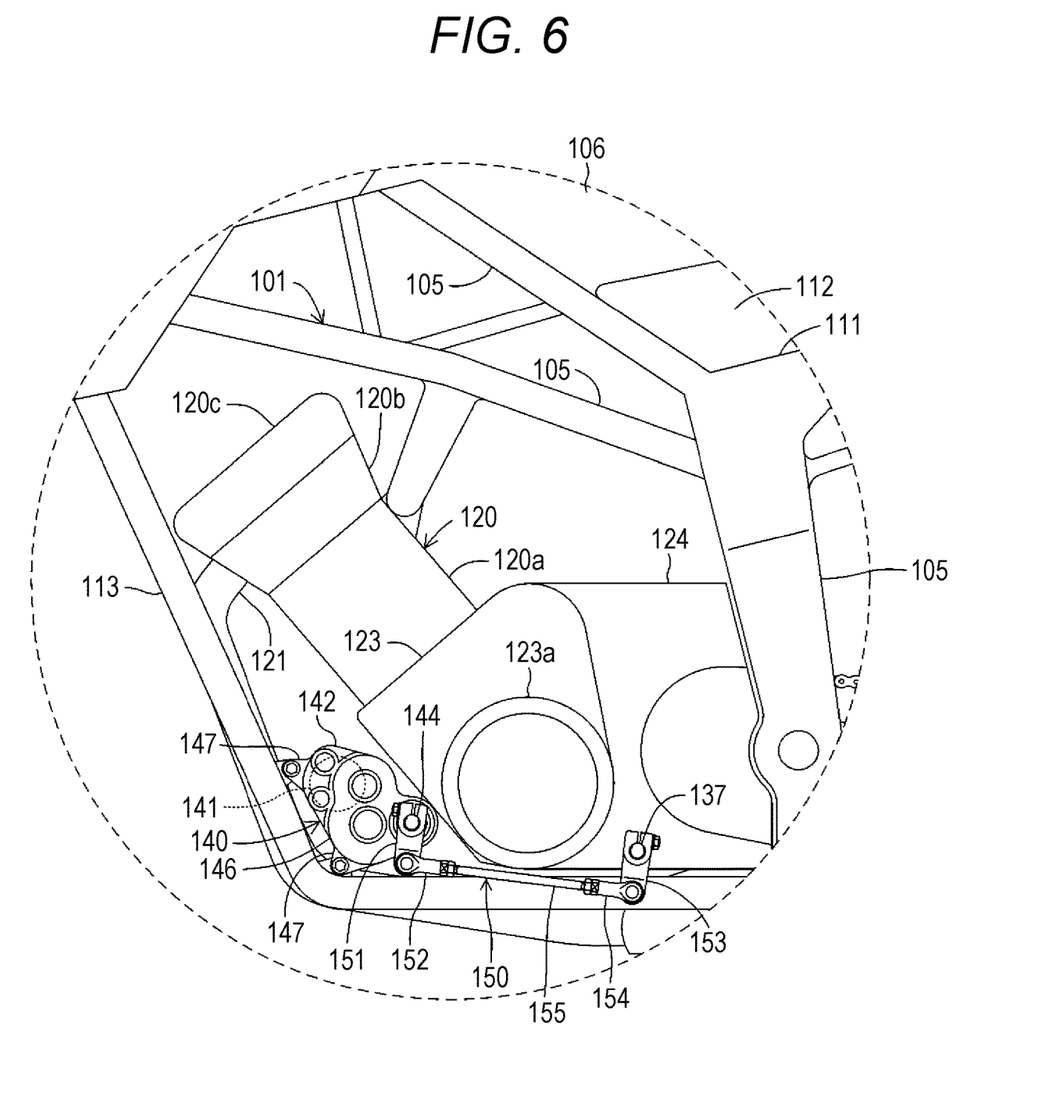
FIG. 6 is a partially enlarged view of a main portion of the saddle-ride type vehicle according to a modification of the present invention.

For example, in the above embodiment, the shift drum drive unit 140 is attached to the front surface of the crankcase 123 below the cylinder block 120a. However, it is sufficient that the shift drum drive unit 140 is disposed below the cylinder block 120a and in front of the crankcase 123, and is not necessarily attached to the crankcase 123. Therefore, for example, as shown in FIG. 6, the shift drum drive unit 140 can be attached to a down tube 113 extending from the frame 101.

Here, the down tube 113 is a component disposed below the main frame 105 and supporting the engine 120 and the power transmission device 124 from below. The down tube 113 droops downwardly from a front side portion of the main frame 105 and then extends rearwardly along lower surfaces of the engine 120 and the power transmission device 124 and is connected to the rear end portion 105a of the main frame 105. Therefore, in the shift drum drive unit 140, the mounting portion 147 can be mounted so as to protrude from the unit case 146 toward the down tube 113 side. In this case, the shift drum drive unit 140 can be protected when the saddle-ride type vehicle 100 falls over, by being mounted inside (the crankcase 123 side) the down tube 113. In FIG. 6, the position of the shift actuator 141 is indicated by a dashed line.

Further, in the above embodiment, the shift drum drive unit 140 is mounted at a position inside the both side surfaces of the crankcase 123 in the vehicle width direction, more specifically inside the crankcase covers 123a, 123b in the vehicle width direction. Thus, in the saddle-ride type vehicle 100, it is possible to prevent the shift drum drive unit 140 from being damaged when the saddle-ride type vehicle 100 falls over. However, the shift drum drive unit 140 can also be mounted in a state of protruding outwardly in the vehicle width direction from the both side surfaces in the vehicle width direction in the crankcase 123.

Further, in the above-described embodiment, in the shift drum drive unit 140, the shift actuator 141 is disposed at a position inside in the vehicle width direction from the decelerator 142. Thus, the saddle-ride type vehicle 100 can prevent the shift drum drive unit 140 from being damaged when the saddle-ride type vehicle 100 falls over. However, in the shift drum drive unit 140, the shift actuator 141 can also be disposed at a position outside in the vehicle width direction from the decelerator 142.

Further, in the above embodiment, the shift drum drive unit 140 is mounted in such a direction that the rotation axis direction of the shift actuator 141 extends in the vehicle width direction. Thus, in the saddle-ride type vehicle 100, it is possible to position a center of gravity position of the shift actuator 141 on a center side of a vehicle body. Thus, it is possible to improve maneuverability of the saddle-ride type vehicle 100 and stability of the vehicle by suppressing displacement of the center of gravity in the vehicle width direction. However, the shift drum drive unit 140 can also be mounted in such a direction that the rotation axis direction of the shift actuator 141 extends in a direction other than the vehicle width direction, for example, in a direction extending in a vertical direction perpendicular to the vehicle width direction.

Further, in the above embodiment, the shift actuator 141 is attached to the crankcase 123 via the decelerator 142. That is, the shift actuator 141 is attached to the crankcase 123 as the shift drum drive unit 140 including the decelerator 142. However, in the case where the shift actuator 141 is configured without the decelerator 142, the shift actuator 141 can be attached directly to the crankcase 123 or the down tube 113.

Further, in the above embodiment, in the shift drive force transmission body 150, the transmission body 155 is disposed above the crankcase cover 123a. This suppresses the transmission body 155 from protruding outwardly in the vehicle width direction, so that the saddle-ride type vehicle 100 can be made compact. Further, the saddle-ride type vehicle 100 can prevent the transmission body 155 from being contaminated and damaged due to obstacles such as curbs on the ground or flying objects from the ground. However, in the shift drive force transmission body 150, the transmission body 155 may be disposed below the crankcase cover 123a. This makes it possible to prevent the saddle-ride type vehicle 100 from thermal influence such as characteristic change due to heating of the drive side arm 151, the drive side connector 152 and the transmission body 155 by heat generated from the cylinder block 120a.

Further, in the above embodiment, the shift drive force transmission body 150 is connected to the shift drum 136 via the shift shaft 137. However, the shift drive force transmission body 150 can also be directly connected to the shift drum 136.

DESCRIPTION OF REFERENCE SIGNS

100: Saddle-ride type vehicle, 101: Frame, 102: Front wheel, 103: Front fork, 104: Handle, 105: Main frame, 105a: Rear end portion, 106: Fuel tank, 107: Swing arm, 108: Rear wheel, 109: Step bracket, 110: Foot placing step, 111: Seat rail, 112: Sitting seat, 113: Down tube, 120: Engine, 120a: Cylinder block, 120b: Cylinder head, 120c: Head cover, 121: Exhaust pipe, 122: Primary drive gear, 123: Crank case, 123a, 123b: Crank case cover, 124: Power transmission device, 125: Clutch, 126: Main shaft, 127: Clutch housing, 128: Friction plate, 129: Clutch plate, 130: Clutch hub, 131: Push rod, 132: Transmission, 133: Gear train, 134: Drive side gear, 135: Shift fork, 136: Shift drum, 136a: Cam groove, 136b: Angle sensor, 137: Shift shaft, 137a: Return spring, 140: Shift drum drive unit, 141: Shift actuator, 142: Decelerator, 143: Gear train, 144: Output shaft, 145: Angle sensor, 146: Unit case, 147: Mounting portion, 150: Shift drive force transmission body, 151: Drive side arm, 152: Drive side connector, 153: Driven side arm, 154: Driven side connector, 155: Transmission body.

The invention claimed is:
1. A saddle-ride type vehicle comprising:
an engine provided between a front wheel and a rear wheel and generating a driving force by combustion of fuel;
a cylinder block constituting a part of the engine;

a crankcase provided below the cylinder block;
a transmission for changing a rotational speed by a plurality of gear trains constituting a plurality of shift stages having different gear ratios with respect to the driving force of the engine;
a shift actuator for rotating a shift drum which changes the gear train in the transmission; and
a rod-shaped transmission body for transmitting a rotational driving force of the shift actuator to the shift drum, wherein
the crankcase has a crankcase cover protruding in a circular shape in a side view outwardly in a vehicle width direction,
the transmission body is disposed above or below the crankcase cover, and
the shift actuator is disposed below the cylinder block and in front of the crankcase.

2. The saddle-ride type vehicle according to claim 1, further comprising a decelerator provided together with the shift actuator at a position below the cylinder block and in front of the crankcase, to reduce and transmit a rotational driving force of the shift actuator to the shift drum, wherein
the shift actuator is disposed on an inner side in a vehicle width direction from the decelerator.

3. The saddle-ride type vehicle according to claim 1, wherein the shift actuator is provided in such a direction that an axial direction of rotational drive extends in a vehicle width direction.

4. The saddle-ride type vehicle according to claim 1, wherein the shift actuator is disposed on an inner side in a vehicle width direction from a side surface of the crankcase.

* * * * *